Feb. 7, 1961  J. C. CANTLEY  2,970,328
TRIMMING MACHINES
Filed April 7, 1959  3 Sheets-Sheet 1

Inventor
Joseph C. Cantley
By his Attorney
Richard G. Wise

Feb. 7, 1961 — J. C. CANTLEY — 2,970,328
TRIMMING MACHINES
Filed April 7, 1959 — 3 Sheets-Sheet 2

Feb. 7, 1961    J. C. CANTLEY    2,970,328
TRIMMING MACHINES
Filed April 7, 1959    3 Sheets-Sheet 3
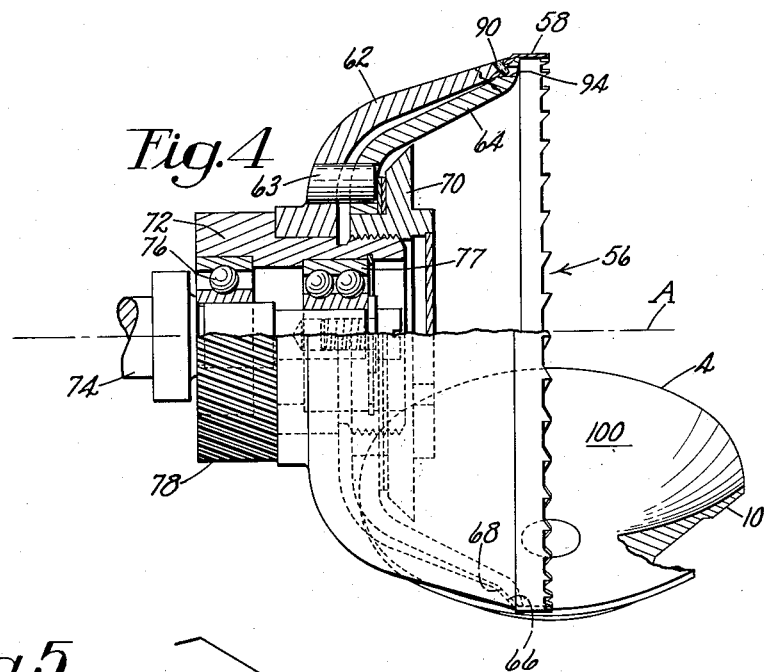
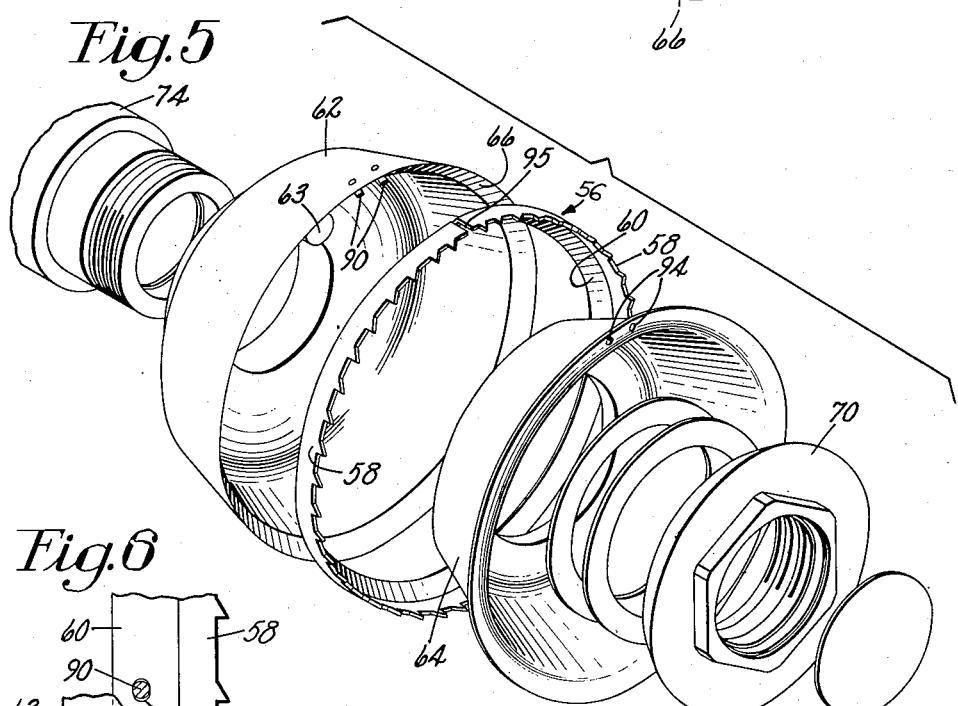
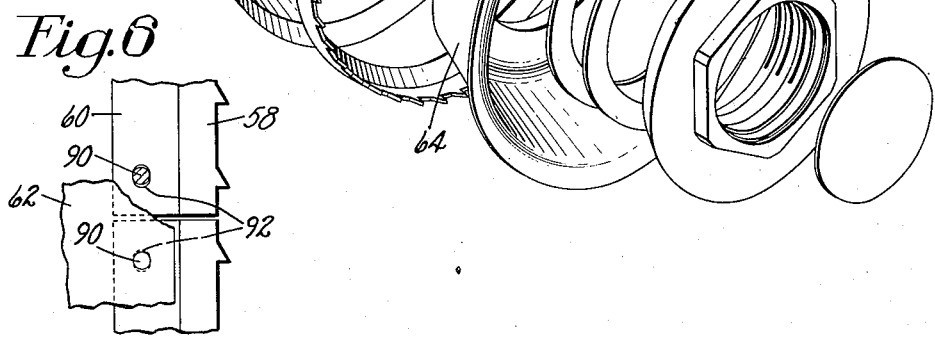

2,970,328
Patented Feb. 7, 1961

2,970,328
TRIMMING MACHINES

Joseph C. Cantley, Beverly, Mass., assignor to United Shoe Machinery Corporation, Flemington, N.J., a corporation of New Jersey Filed Apr. 7, 1959, Ser. No. 804,827

2 Claims. (Cl. 12—4.3)

This invention relates to machines for performing trimming operations on shoe bottoms and more particularly to machines for trimming the inseams of partially fabricated welt shoes. A machine of this type is disclosed in United States Letters Patent No. 1,226,872, granted May 22, 1917 to Andred Eppler. It is to be understood, however, that in certain aspects thereof the invention is not limited to inseam trimming machines but is applicable generally to trimming machines which operate progressively about a shoe to remove excess material therefrom.

The patent to Eppler discloses an inseam trimming machine by which surplus portions of the inseam are severed by a cup-shaped rotary trimming knife which cuts the inseam material into long thin strips comprising upper leather, insole rib material, canvas reinforcing material and a tar-like substance from the box toe or stiffening material, etc. It is not infrequent that lasting staples are encountered in the trimming process, which, along with the continual daily usage, requires that the cup-shaped or annular trimming knife be sharpened frequently. To this end most inseam trimming machines are provided with sharpening mechanism which grinds the knife without requiring its removal from the machine. Naturally a point is reached when the knife must be discarded because it became too small due to repeated grindings. Knives of the type presently in use are costly since they must be precision manufactured and of hardened steel to withstand their rigorous usage.

Accordingly, one of the objects of this invention is to provide an inseam trimming machine having an inexpensive trimming cutter.

Another object is to provide an inseam trimming machine having a cutter with a blade which does not require grinding and which may be replaced at nominal expense.

Applicant has found that if the trimming knife is replaced with an expendable saw blade, the expense of replacement is considerably reduced and the necessity for sharpening is completely eliminated. Because of numerous other uses, blade stock having hardened teeth is relatively inexpensive and numerous expendable blades may be produced for the cost of a single annular trimming knife of the type currently in use.

The most popular inseam trimmer in use today is generally of the type illustrated in the above-identified Eppler patent and employs a cup-shaped knife and cooperating members for feeding the work to the knife. The feeding members include a feed wheel having a frusto conical periphery for engaging the welt and a dished or concave upper face within which the trimming knife rotates. The purpose of the concave face in the feed wheel is to accommodate the knife whereby its trimming point, which is usually its lowest point, may trim close to the stitch line of the inseam. The inseam extends upwardly from the welt, the shoe being gripped in the machine by the frusto conical periphery of the feed wheel and a conical presser roll or welt crease guide. Applicant has found that the Eppler trimming knife may be replaced by a rotary saw cutter which is constructed so that the cutting or tooth edge has the greatest diameter of any portion of the cutter.

Applicant has also found that there is no advantage in taking the Eppler rotary knife cutter and forming saw teeth on its surface since its expense is then greater than the knife alone and the advantages of a saw blade cutter which, incidentally, is capable of trimming an inseam more rapidly than the knife, are best gained by providing a separate cutting blade and making it readily replaceable in a permanent rotary clamping member.

These and other meatures of the invention and the advantages gained thereby will best be understood from a consideration of the following specification taken in conjunction with the accompanying drawings, in which:

Fig. 4 is a detail view partly in section of the cutter shown in cooperative relationship with the rotary feed wheel;

Fig. 5 is an exploded perspective view of the cutter;

Fig. 6 is a detail view of a portion of the cutter; and

Figure 1:
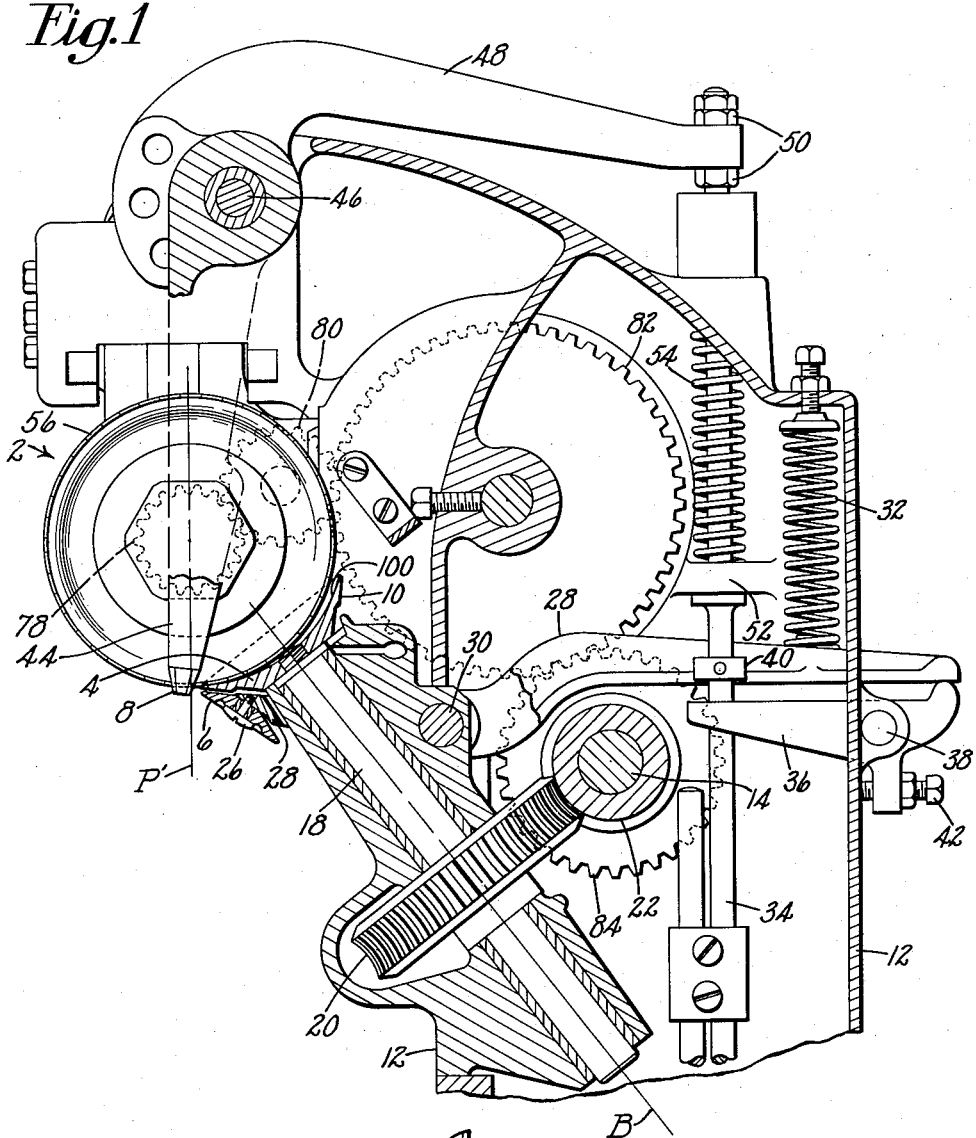
Fig. 1 is a side elevation, partly in section, of the head of an inseam trimming machine embodying the principles of the present invention.
Figure 2:
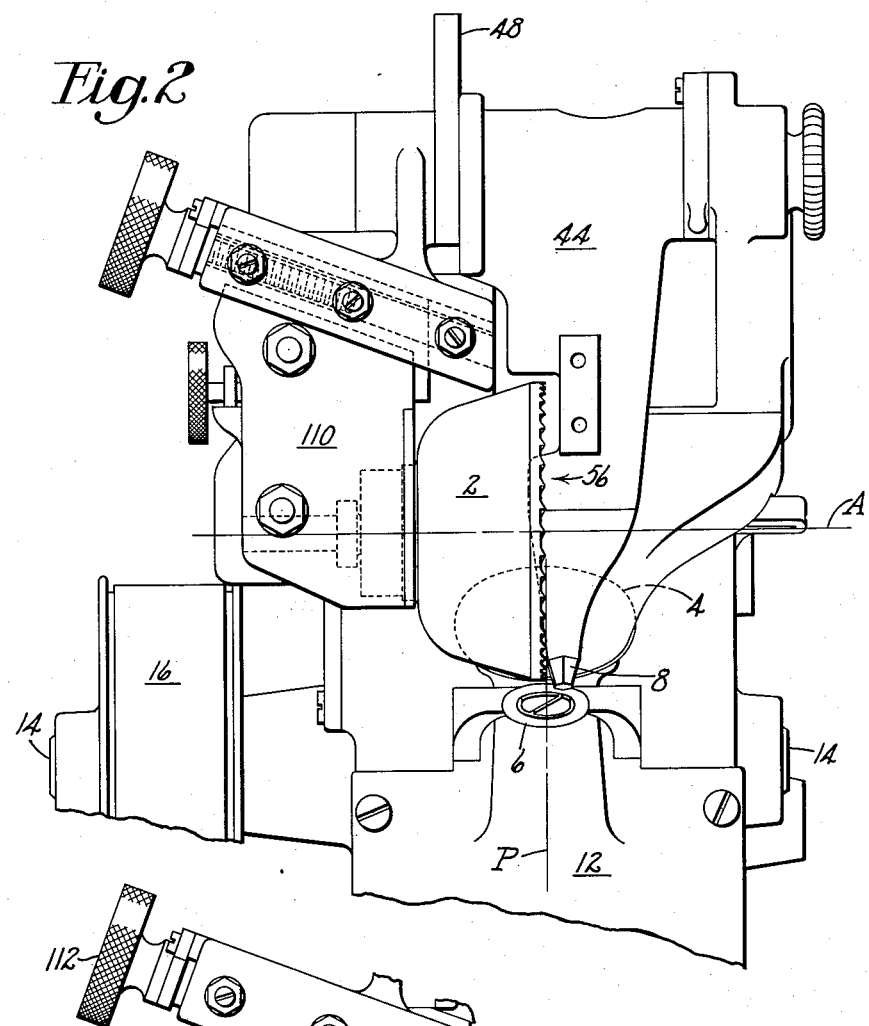
Fig. 2 is a front elevation of the portion of the machines illustrated in Fig. 1 and showing the inseam cutter and its associated structure.

The usual arrangement of the feeding and trimming instrumentalities of an inseam trimmer are seen in Figs. 1 and 2. In many respects the illustrative machine is similar to that shown in the above-identified Eppler patent to which reference may be had for a more detailed description of the common parts. A rotary cutter 2 having a saw tooth cutting edge is employed to trim the inseam and will be described in detail hereinafter. Co-operating with the cutter to feed and trim the shoe are a driven feed wheel 4 and a welt crease guide 6 plus a rotating rib guide 8 all mounted adjacent the lower edge or cutting point of the rotary cutter 2. The welt crease guide 6 is shaped and mounted on the machine to enter the crease between the grain side or upper engaging surface of the welt and the upper leather to press the welt against the feed wheel 4 and also a restrict lateral movement of the shoe inwardly of the machine. The feed wheel 4 has a knurled conical periphery 10 engageable with the flesh side or outside attaching surface of the welt opposite the welt crease guide, it being noted that a shoe when being trimmed is maintained bottom upwards. The rib guide 8 is engageable with the inner surface of the insole rib, and may be either non-rotatable, mounted for idling rotation or power driven as it actually is in many commercial machines.

The machine has a main frame 12 in which is journaled a main drive shaft 14 which receives its power from any convenient means, as for example, a motor driven belt and pulley 16 (Fig. 2). The shaft 14 is driven in a clockwise direction when viewed in the direction of feed, as seen in Fig. 1, which represents the right-hand or feeding side of the machine as seen by the operator. The feed wheel 4 is mounted on the upper end of a driven shaft 18 journaled for rotation in the main frame 12. A gear 20 is fixed to the lower end of the shaft 18 and meshes with a gear 22 of the main driving shaft 14.

The welt crease guide 6 comprises an idler wheel mounted for rotation on a stud 26 threaded in the forward end of a lever 28 which is pivoted in the machine frame on a stud 30. The welt crease guide is biased upward toward the feed wheel 4 to grip the welt, by means of a compression spring 32 which bears upon the rearward end of the lever 28. To release the welt crease guide 6 from its gripping position in order to insert a shoe, the operator depresses a rod 34, which extends vertically through the frame of the machine, by a treadle, not shown. An adjustable force transmitting lever 36 is mounted for pivotal movement about a stud 38 at the rear of the machine and when a collar 40 secured to the rod 34 bears downwardly upon the inner end of the lever 36, its outer or rearward end moves upwardly. The space between the welt crease guide 6 and the feed wheel 4 is initially adjusted to an amount just less than the thickness of the welt to be trimmed, by an adjusting screw 42 threaded in the lever 36 and which bears against the machine frame 12. The more the screw is advanced toward the machine frame the greater the space becomes between the welt crease guide 6 and the feed wheel 4.

The rib guide 8 is mounted for rotation at the lower end of a bracket 44, the upper end of which is mounted for pivotal movement about a shaft 46 fixed in the upper portion of the machine frame. As stated above, the rib guide 8 may be power driven or may be free to idle at the lower end of the bracket 44. As in the prior art machines, the pivotal motion of the bracket 44 is controlled by a lever arm 48, which, at its rearward end, is attached to the treadle rod 34 by lock nuts 50. Surrounding the upper end of the rod 34 and compressed between a stationary strut 52 in the frame and a collar (not shown) on the rod is a compression spring 54. When the rod 34 is moved downwardly, the lever 48 is rotated in a clockwise direction about the shaft 46. Hence, the rib guide bracket 44 which is adjustably connected to the lever 48 is also rotated in a clockwise direction about the shaft 46 to move the rib guide 8 out of operative position to permit a shoe to be inserted in the machine. When the treadle is release, the compression spring 54 supplies the force to urge the rib guide 8 against the inner surface of the inseam which continues during the trimming process. All of the above-described mechanism is similar to that disclosed in the prior art and operates in a like manner as illustrated by the above-identified patent to Eppler.

The cutter 2 will now be described, referring particularly to Figs. 4, 5 and 6. The cutter comprises a saw tooth blade indicated generally by the reference character 56 and comprises a substantially cylindrical portion 58 and a substantially frusto conical portion 60. The saw teeth are formed on the forward edge of the cylindrical portion 58 and the conical portion 60 is firmly clamped between outer and inner bell or cup-shaped clamping members 62 and 64, respectively. There is formed an internal frusto conical bearing surface 66 on the outer member 62 and a similar external frusto-conical surface on the inner clamping member 64 to engage the conical surface 60 of the blade. The outer and inner clamping members are urged toward each other by a clamping nut 70 which is threaded onto a short shaft 72 which in turn is rotatably mounted on a shaft 74 by appropriate bearings 76 and 77. Relative rotative movement between the clamping members 62, 64 is prevented by a stud 68 passing between them. Rotary motion is, however, imparted to the assembled cutter about an axis A by a gear 78 on the shaft 72 which is driven through a gear train (Fig. 1) comprising gears 80, 82 and 84, the latter being secured to the main drive shaft 14. Short studs 90 project inwardly from the outer clamping member 62 and pass through appropriately spaced holes 92 (Fig. 6) in the conical portion 60 of the cutter blade and are received in matching holes 94 in the inner clamping member. These studs 90 prevent rotation of the cutter blade relatively to the clamping members and also provide convenient means for assembling the cutter when blades are being replaced. An obvious advantage of the above-described cutter is the ease of replacement of the blade 56, it being noted that the blade is split or interrupted as at 95 between the holes 92. Replacement is accomplished by removing the clamping screw 70 and disassembling the inner and outer clamping members whereupon the old blade may be sprung out and a new one inserted with a minimum of effort.

Figure 7:
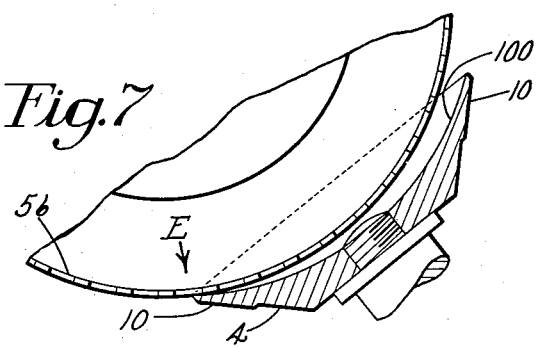
Fig. 7 is a detail view of a portion of the cutter and its associated mechanism similar to Fig. 1 but on an enlarged scale.

As in prior inseam trimming machines, the rotary feed wheel 4 has a spherical concave upper face or surface providing a bowl like depression or configuration 100 within which portions of a cutter blade rotate. Its purpose is to accommodate the curve of the blade so that at the point of trim, which is its lowermost point E (Fig. 7), the blade will approach as close as possible the work engaging or feeding surface 10 of the feed wheel 4 to assure a trim taking place just above the inseam stitch line. This will be seen best in Fig. 7 wherein a portion of the periphery of the blade is shown accommodated within the depression or bowl 100. However, since the depression in the feed wheel is spherical, a portion of the lengthwise or axial dimension of the cutter is accommodated within the depression as well. This is seen in Fig. 4. Accordingly, the clamping members are constructed such that no portion extends outwardly of the cylindrical or cutting portion 58 of the blade. In other words, the cylindrical portion 58 of the cutter blade constitutes the largest portion of the entire cutter measured circumferentially. Because of this, the above-described novel mechanism for clamping the blade was developed. Hence, the noncutting portion or clamping portion 60 of the blade is formed with an inwardly projecting or substantially conical surface. While this surface need not necessarily be conical the same has been selected as the illustrative example. As explained above, it is a requirement that the clamping portion have a lesser diameter than the cutting portion and since it is somewhat easier to form a conical surface than one which is parabolic or elliptical, for example, the former is preferred. It will be noted that as mentioned briefly above, the general configuration of the outer and inner clamping members 62 and 64 and hence of the overall cutter, is bell or cup-shaped and tapers inwardly of the cylindrical portion 58 of the cutter blade. Thus, the cutter fits closely within the depressed spherical portion 100 of the feed wheel 4. Were the entire cutter blade, including the clamping portion 60, cylindrical some portion of the outer clamping member 62 would of necessity have to extend outwardly of the circumference of the blade and would restrict or limit the proximity with which the blade could approach the feed wheel surface 100. This naturally is to be avoided as it would increase the height of trim which is undesirable.

Figure 3:
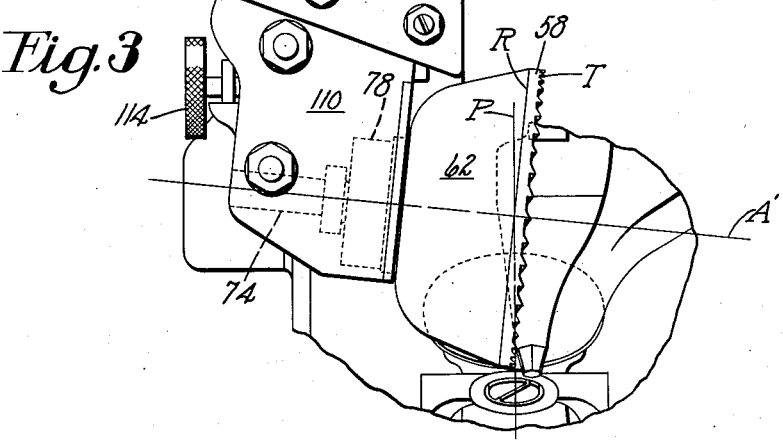
Fig. 3 is a front elevation similar to Fig. 2 showing an alternative method of mounting the cutter.

In order to permit the teeth of the blade to approach the concave surface 100 of the feed wheel even more closely, it is within the scope of this invention to incline the axis of rotation A of the cutter downwardly to a new axis designated A' in Fig. 3. In the illustrative machine the axis of rotation B (Fig. 1) of the feed wheel 4 lies in a vertical plane P (Fig. 2) and both the axes A and A' of the cutter also lie in a vertical plane P' (Fig. 1) which is normal to the plane P. However, the axis A' forms an acute angle with the plane P (Fig. 3) while the axis A is normal to the plane P. Inclining the axis at a downward acute angle permits the forward or toothed edge T (Fig. 3) of the cylindrical portion 58 of the blade to rotate somewhat more closely to the concave surface 100 of the feed wheel than the rearward edge R. This is accomplished in the following manner: As in prior machines, the cutter shaft 74 is rotatably mounted in an adjustable bracket 110 the position of which is controlled by adjusting screws 112 and 114. To incline the axis of the cutter, the mounting of the bracket 110 is merely tilted by any mechanical means (not shown) and appropriately inclined driving gears selected.

Having thus described my invention, what I claim as new and desire to secure by Letters Patent of the United States is:

1. An inseam trimming cutter having inner and outer clamping members, each of which has formed thereon cooperating clamping surfaces substantially conical in configuration, a saw blade having a portion arranged to be clamped between said clamping surfaces and a cutting portion having cutting teeth formed thereon, said cutting portion having a diameter at least as great as both said clamping portion and said clamping members.

2. An inseam trimming cutter comprising an outer clamping member having an interior frusto conical surface, an inner clamping member having an exterior frusto conical surface, means mounting said clamping members for rotation about a central axis, a cutting blade having a substantially cylindrical cutting portion with saw teeth formed thereon, and a clamping portion opposite said teeth and extending between said inner and outer clamping surface, the cutting portion of said blade having a greater diameter than the remaining portions of said cutter, the continuity of said blade being interrupted by a break in its periphery, a pair of studs extending between said outer and inner clamping members and arranged to pass through holes formed in the clamping portion of said blade thereby to facilitate mounting of said blade in the clamping members and to prevent its rotation relatively thereto.

References Cited in the file of this patent

UNITED STATES PATENTS

| | | |
|---|---|---|
| 579,751 | Harris | Mar. 30, 1897 |
| 1,154,713 | Meyer | Sept. 28, 1915 |
| 1,226,872 | Eppler | May 22, 1917 |
| 1,720,769 | Stephenson | July 16, 1929 |
| 2,030,057 | Eppler | Feb. 11, 1936 |
| 2,107,281 | Bazzoni | Feb. 8, 1936 |
| 2,284,846 | Ray | June 2, 1942 |
| 2,477,037 | Baker | July 26, 1949 |